United States Patent
Higuchi et al.

(10) Patent No.: US 12,174,139 B2
(45) Date of Patent: Dec. 24, 2024

(54) GAS SENSOR CONTROL DEVICE, GAS SENSOR CONTROL SYSTEM, AND GAS SENSOR SYSTEM

(71) Applicant: NGK SPARK PLUG CO., LTD., Nagoya (JP)

(72) Inventors: Yuzo Higuchi, Nagoya (JP); Koji Ishibashi, Nagoya (JP); Junichiro Mitsuno, Nagoya (JP); Satoru Abe, Nagoya (JP); Yuji Oi, Nagoya (JP)

(73) Assignee: Niterra Co., Ltd., Nagoya (JP)

( * ) Notice: Subject to any disclaimer, the term of this patent is extended or adjusted under 35 U.S.C. 154(b) by 319 days.

(21) Appl. No.: 17/279,734

(22) PCT Filed: Mar. 9, 2020

(86) PCT No.: PCT/JP2020/010063
§ 371 (c)(1),
(2) Date: Mar. 25, 2021

(87) PCT Pub. No.: WO2020/189380
PCT Pub. Date: Sep. 24, 2020

(65) Prior Publication Data
US 2021/0396702 A1  Dec. 23, 2021

(30) Foreign Application Priority Data

Mar. 15, 2019 (JP) .................. 2019-048714

(51) Int. Cl.
*G01N 27/30* (2006.01)
*F02D 41/14* (2006.01)
*G01N 27/419* (2006.01)

(52) U.S. Cl.
CPC .......... *G01N 27/30* (2013.01); *G01N 27/419* (2013.01); *F02D 41/1454* (2013.01)

(58) Field of Classification Search
CPC .. G01N 27/30; G01N 27/419; G01N 27/4175; F02D 41/1454; F02D 41/222; Y02T 10/40
See application file for complete search history.

(56) References Cited

U.S. PATENT DOCUMENTS

2003/0155238 A1* 8/2003 Hada .................. G01N 27/4067
 204/431
2004/0238378 A1* 12/2004 Kumazawa .......... G01N 27/419
 205/781

(Continued)

FOREIGN PATENT DOCUMENTS

| JP | 2016-70881 A | 5/2016 |
| JP | 2016-070883 A | 5/2016 |
| JP | 2018-185163 A | 11/2018 |

OTHER PUBLICATIONS

International Search Report for PCT/JP2020/010063, dated May 26, 2020.

(Continued)

*Primary Examiner* — Luan V Van
*Assistant Examiner* — Shizhi Qian
(74) *Attorney, Agent, or Firm* — Sughrue Mion, PLLC

(57) ABSTRACT

A gas sensor control device having a DA conversion circuit configured to supply a pump current having a magnitude corresponding to an inputted digital signal to the pump cell, a reference electric potential generating circuit configured to keep an electric potential of the first pump electrode at a reference electric potential, a diagnostic resistance connected to the pump cell parallel to the pump cell, and an output part configured to output a signal relating to voltage applied to the diagnostic resistance when inputting an arbitrary digital signal to the DA conversion circuit in a situation (Continued)

in which oxygen ion conductivity does not occur in the pump cell to an external device.

3 Claims, 2 Drawing Sheets

(56) References Cited

U.S. PATENT DOCUMENTS

| | | | | |
|---|---|---|---|---|
| 2006/0157348 | A1* | 7/2006 | Inoue | F02D 41/1494 73/1.06 |
| 2006/0219553 | A1* | 10/2006 | Ieda | G01N 33/007 204/424 |
| 2007/0273540 | A1* | 11/2007 | Inoue | G01N 27/407 702/116 |
| 2008/0060941 | A1* | 3/2008 | Ieda | G01N 27/4065 204/431 |
| 2016/0097737 | A1* | 4/2016 | Higuchi | G01N 27/4175 204/401 |
| 2016/0097738 | A1* | 4/2016 | Higuchi | G01N 27/4175 204/401 |
| 2016/0169832 | A1* | 6/2016 | Higuchi | G01N 27/4065 204/424 |
| 2018/0306136 | A1 | 10/2018 | Mitsuno et al. | |

OTHER PUBLICATIONS

Communication dated Feb. 7, 2022, issued by the Intellectual Property Office of India in corresponding application No. 202117012729.

* cited by examiner

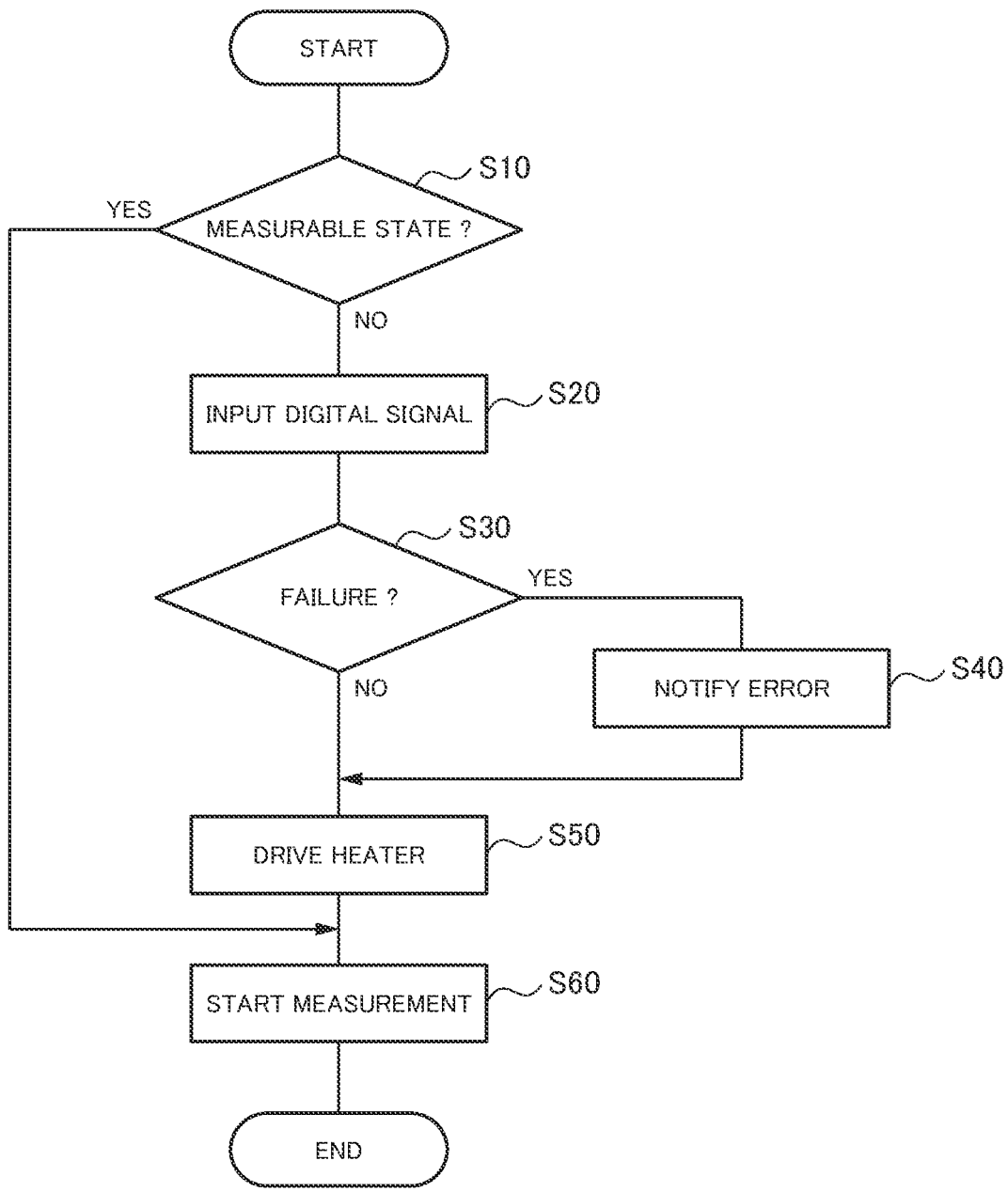

GAS SENSOR CONTROL DEVICE, GAS SENSOR CONTROL SYSTEM, AND GAS SENSOR SYSTEM

CROSS-REFERENCE OF RELATED APPLICATIONS

This is a national stage of International Application No. PCT/JP2020/010063 filed Mar. 9, 202, claiming priority from Japanese Patent Application No. 2019-048714 filed Mar. 15, 2019 incorporated herein by reference in its entirety.

TECHNICAL FIELD

The present disclosure relates to a gas sensor control device, a gas sensor control system and a gas sensor system.

BACKGROUND ART

As an oxygen sensor for detecting an air fuel ratio of exhaust gas exhausted from an internal combustion engine etc., a two-cell type gas sensor system using a pump cell and an oxygen concentration measuring cell is known (see Patent Document 1).

In the two-cell type gas sensor system, an electromotive force is generated between two electrodes of the oxygen concentration measuring cell on the basis of a difference in oxygen concentration between atmospheres where the two electrodes are arranged. The gas sensor system controls a magnitude and a direction of a pump current that passes through the pump cell so that the electromotive force becomes a predetermined value, and measures an oxygen concentration on the basis of this pump current.

Further, in the gas sensor system, in order to reduce a circuit size, instead of a conventional analog pump current supply circuit, a DA conversion circuit that supplies the pump current on the basis of an inputted digital signal is used.

CITATION LIST

Patent Document

Patent Document 1: Japanese Unexamined Patent Application Publication No. 2016-070883

SUMMARY OF THE INVENTION

Technical Problem

In a case of a conventional analog gas sensor system not using the DA conversion circuit, by directly measuring the pump current at or through a fixed resistance, a supply error of the pump current can be detected. However, in a case of the gas sensor system using the DA conversion circuit, since there is no fixed resistance in a supply path of the pump current, such detection method cannot be used. Therefore, a method of judging whether the DA conversion circuit normally operates and a correct pump current is supplied is required.

As one aspect of the present disclosure, it is preferable to provide a gas sensor control device that is capable of diagnosing a failure of the DA conversion circuit.

Solution to Problem

One aspect of the present disclosure is a gas sensor control device connected to a gas sensor including a solid electrolyte and a pump cell having a first pump electrode and a second pump electrode that are separately arranged on the solid electrolyte. The gas sensor control device comprises a DA conversion circuit configured to supply a pump current having a magnitude corresponding to an inputted digital signal to the pump cell; a reference electric potential generating circuit configured to keep an electric potential of the first pump electrode at a reference electric potential; a diagnostic resistance connected to the pump cell parallel to the pump cell; and an output part configured to output a signal relating to voltage applied to the diagnostic resistance when inputting an arbitrary digital signal to the DA conversion circuit in a situation in which oxygen ion conductivity does not occur in the pump cell to an external device.

According to the above configuration, in a non-measurable state in which a resistance of the pump cell is large and the oxygen ion conductivity does not occur in the pump cell, the signal for diagnosing the failure of the DA conversion circuit can be outputted to the external device.

Another aspect of the present disclosure is a gas sensor control system comprising the above gas sensor control device; and an external device connected to the gas sensor control device. The external device has a diagnosing part configured to diagnose a failure of the DA conversion circuit on the basis of the signal relating to the voltage.

According to the above configuration, in the external device, it is possible to diagnose whether current having a correct magnitude is supplied from the DA conversion circuit (that is, it is possible to diagnose the failure of the DA conversion circuit).

A further aspect of the present disclosure is a gas sensor system comprising a gas sensor; and the above gas sensor control system.

According to the above configuration, it is possible to provide a system for diagnosing whether current having a correct magnitude is supplied from the DA conversion circuit (i.e. a system for diagnosing the failure of the DA conversion circuit) in the external device.

BRIEF DESCRIPTION OF THE DRAWINGS

FIG. 2 is a flow chart of an operation performed by the gas sensor system of FIG. 1.

EXPLANATION OF REFERENCE

Figure 1:
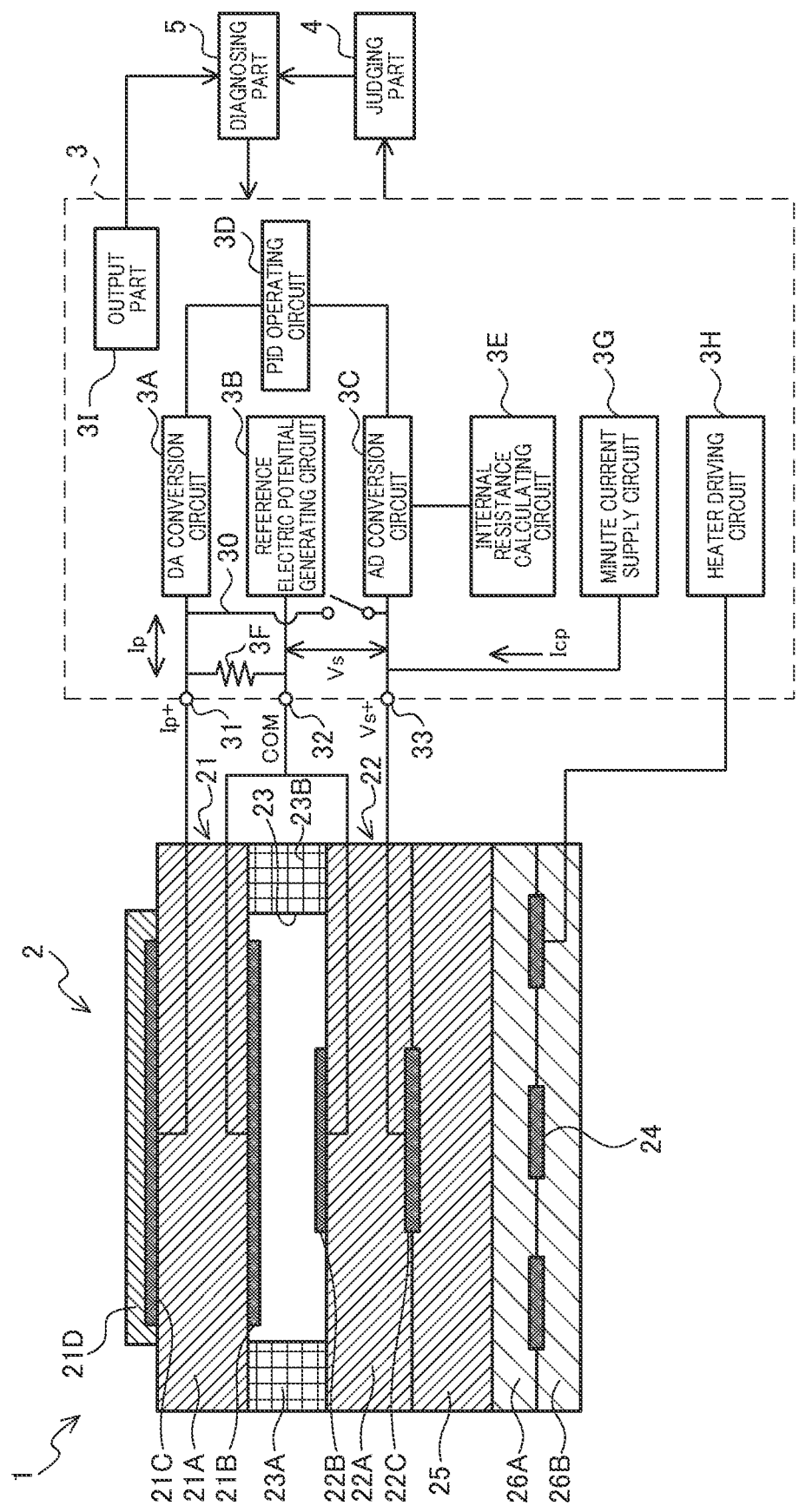
FIG. 1 is a schematic structural diagram of a gas sensor system according to an embodiment.

1 . . . gas sensor system, 2 . . . sensor body, 3 . . . circuit part, 3A . . . DA conversion circuit, 3B . . . reference electric potential generating circuit, 3C . . . AD conversion circuit, 3D . . . PID operating circuit, 3E . . . internal resistance calculating circuit, 3F . . . diagnostic resistance, 3G . . . minute current supply circuit, 3H . . . heater driving circuit (heater operating circuit), 3I . . . output part, 4 . . . judging part, 5 . . . diagnosing part, 21 . . . pump cell, 21A . . . first solid electrolyte, 21B . . . first pump electrode, 21C . . . second pump electrode, 21D . . . porous layer, 22 . . . oxygen concentration measuring cell, 22A . . . second solid electrolyte, 22B . . . first measurement electrode, 22C . . . second measurement electrode, 23 . . . measurement gas chamber, 23A . . . first porous body, 23B . . . second porous body, 24 . . . heater, 25 . . . reinforcing plate, 26A . . . first insulating layer, 26B . . . second insulating layer, 30 . . . switching path, 31 . . . Ip+ terminal, 32 . . . COM terminal, 33 . . . Vs+ terminal

EMBODIMENTS FOR CARRYING OUT THE INVENTION

In the following description, embodiments to which the present disclosure is applied will be explained with reference to the drawings.

1. First Embodiment

[1-1. Configuration]

A gas sensor system 1 shown in FIG. 1 is a sensor that detects an oxygen concentration in gas to be measured.

The gas sensor system 1 is used for the purpose of, e.g. detecting an oxygen concentration of exhaust gas exhausted from an internal combustion engine in order to measure an air fuel ratio of the internal combustion engine, and detecting a NOx concentration of the exhaust gas of the internal combustion engine.

The gas sensor system 1 has a sensor body 2, a circuit part 3, a judging part 4 and a diagnosing part 5.

<Sensor Body>

The sensor body 2 is a gas sensor having a pump cell 21, an oxygen concentration measuring cell 22, a measurement gas chamber 23 and a heater 24. The sensor body 2 is a stacked body (or a multilayer body) formed by a plurality of layered solid electrolytes for forming respective cells, a plurality of electrodes and a plurality of insulating layers being arranged in layers.

Each solid electrolyte is not particularly limited as long as the solid electrolyte has oxygen ion conductivity. For instance, a layer having zirconia as a main component can be used. Here, "main component" means a component contained in the electrolyte as 60 mass % or more of component.

(Pump Cell)

The pump cell 21 has a first solid electrolyte 21A, a first pump electrode 21B and a second pump electrode 21C that are arranged on the first solid electrolyte 21A so as to sandwich the first solid electrolyte 21A.

The first pump electrode 21B is arranged in the measurement gas chamber 23.

The second pump electrode 21C is arranged in a space that communicates with the outside of the stacked body forming the sensor body 2. Further, the second pump electrode 21C is covered with a porous layer 21D. The porous layer 21D has ceramic such as alumina as a main component.

(Oxygen Concentration Measuring Cell)

The oxygen concentration measuring cell 22 has a second solid electrolyte 22A, a first measurement electrode 22B and a second measurement electrode 22C that are arranged on the second solid electrolyte 22A so as to sandwich the second solid electrolyte 22A.

A reinforcing plate 25 is arranged on a surface, located at an opposite side to the pump cell 21, of the second solid electrolyte 22A (i.e. a surface, located at a heater 24 side, of the second solid electrolyte 22A). The reinforcing plate 25 is an insulating member having ceramic as a main component.

The first measurement electrode 22B is arranged in the measurement gas chamber 23.

The second measurement electrode 22C is arranged with the second measurement electrode 22C being sandwiched between the reinforcing plate 25 and the second solid electrolyte 22A.

(Measurement Gas Chamber)

The measurement gas chamber 23 is a chamber (or a room) for taking in oxygen in the gas to be measured. In the measurement gas chamber 23, the first pump electrode 213 and the first measurement electrode 223 are arranged.

The measurement gas chamber 23 is formed by defining a space provided between the first solid electrolyte 21A and the second solid electrolyte 22A by a first porous body 23A and a second porous body 23B. The space communicates with the outside of the stacked body forming the sensor body 2 through the first porous body 23A and/or the second porous body 23B. Each of the first porous body 23A and the second porous body 23B has ceramic such as alumina as a main component.

(Heater)

The heater 24 heats the pump cell 21 and the oxygen concentration measuring cell 22, and activates the solid electrolytes of these cells.

The heater 24 is arranged between a first insulating layer 26A and a second insulating layer 26B each having ceramic as a main component. The heater 24 has a heat generating resistor that generates heat by being energized. The heater 24 is made of, for instance, platinum (Pt).

Here, the first insulating layer 26A is arranged on a surface, located at an opposite side to the oxygen concentration measuring cell 22, of the reinforcing plate 25. The second insulating layer 26B is arranged on a surface, located at an opposite side to the reinforcing plate 25, of the first insulating layer 26A.

<Circuit Part>

The circuit part 3 is configured by circuits that drive the sensor body 2. The circuit part 3 forms a gas sensor control device that is connected to the sensor body 2. The circuit part 3 could be incorporated into an electronic control unit (ECU) of a vehicle.

The circuit part 3 has a DA conversion circuit 3A, a reference electric potential generating circuit 3B, an AD conversion circuit 3C, a PID operating circuit 3D, an internal resistance calculating circuit 3E, a diagnostic resistance 3F, a minute current supply circuit 3G, a heater driving circuit (a heater operating circuit) 3H and an output part 3I.

The DA conversion circuit 3A is a digital-to-analog converter that supplies a pump current Ip having a magnitude corresponding to an inputted digital signal to the pump cell 21. The DA conversion circuit 3A is connected to the second pump electrode 21C of the pump cell 21 through an Ip+ terminal 31.

An output system (or an output mode) of the DA conversion circuit 3A is not particularly limited. As the DA conversion circuit 3A, a current DAC for outputting current, a voltage DAC for outputting voltage, a PWM-type DAC for modulating a pulse width that is going to be outputted, etc. can be used.

The reference electric potential generating circuit 3B keeps electric potentials of the first pump electrode 21B and the first measurement electrode 22B at a reference electric potential (e.g. 2.7V). The reference electric potential generating circuit 3B applies a reference voltage to a COM terminal 32 that is connected to the first pump electrode 21B and the first measurement electrode 22B.

The AD conversion circuit 3C is an analog-to-digital converter that converts an electromotive force (i.e. voltage between the first measurement electrode 22B and the second measurement electrode 22C) Vs generated at the oxygen concentration measuring cell 22 on the basis of a difference in oxygen concentration between the first measurement electrode 22B and the second measurement electrode 22C into a digital signal. The AD conversion circuit 3C is connected to the second measurement electrode 22C through a Vs+ terminal 33. The AD conversion circuit 3C converts a voltage value inputted from the Vs+ terminal 33 into the digital signal, and outputs it to the PID operating circuit 3D and the internal resistance calculating circuit 3E.

At a time of diagnosis of the DA conversion circuit 3A which will be described later, the AD conversion circuit 3C is connected to the Ip+ terminal 31 by a switching path 30. With this, voltage of the Ip+ terminal 31 can be measured by the AD conversion circuit 3C. It is noted that during measurement of the oxygen concentration, the AD conversion circuit 3C is not connected to the Ip+ terminal 31. That is, at a time of the measurement of the oxygen concentration, no current passes through the switching path 30.

The PID operating circuit 3D PID-controls the pump current Ip on the basis of the digital signal inputted from the AD conversion circuit 3C. More specifically, the PID operating circuit 3D performs a PID operation so that voltage between the Vs+ terminal 33 and the COM terminal 32 becomes a predetermined control reference voltage. Here, the control reference voltage is, for instance, 450 mV.

The PID operating circuit 3D outputs a digital signal corresponding to a value of the pump current Ip obtained by the PID operation to the DA conversion circuit 3A. The DA conversion circuit 3A supplies the pump current Ip whose magnitude is based on the digital signal inputted from the PID operating circuit 3D. Also, an input signal to the DA conversion circuit 3A is outputted to, e.g. the ECU as a detection result of the pump current Ip.

The internal resistance calculating circuit 3E calculates an internal resistance (Rpvs) of the oxygen concentration measuring cell 22 on the basis of the digital signal outputted from the AD conversion circuit 3C when the minute current supply circuit 3G supplies a pulse current to the oxygen concentration measuring cell 22.

The diagnostic resistance 3F is connected to the pump cell 21 parallel to the pump cell 21. More specifically, the diagnostic resistance 3F is connected to a point between the Ip+ terminal 31 and the DA conversion circuit 3A and a point between the COM terminal 32 and the reference electric potential generating circuit 3B.

In a state in which it is impossible to measure the oxygen concentration by the oxygen concentration measuring cell 22 (i.e. in a state in which resistance values of internal resistances of the pump cell 21 and the oxygen concentration measuring cell 22 are large then substantially no current flows), the current outputted from the DA conversion circuit 3A flows to the reference electric potential generating circuit 3B through the diagnostic resistance 3F.

As a lower limit of a resistance value of the diagnostic resistance 3F, 100 kΩ is preferable. On the other hand, as an upper limit of the resistance value of the diagnostic resistance 3F, 10 MΩ is preferable, and 1 MΩ is far preferable.

If the resistance value of the diagnostic resistance 3F is too small, since the pump current Ip flows to the diagnostic resistance 3F at the time of the measurement of the oxygen concentration, there is a risk that measurement accuracy of the oxygen concentration will be lowered.

On the other hand, if the resistance value of the diagnostic resistance 3F is too large, a sufficient current does not flow to the diagnostic resistance 3F at the time of the failure diagnosis of the DA conversion circuit 3A, then an influence of potential drop due to leak current (e.g. about 1 μA to 10 μA) of the Ip+ terminal 31 becomes great. As a consequence, there is a risk that failure diagnosis accuracy of the DA conversion circuit 3A will be lowered.

The minute current supply circuit 3G is connected to the second measurement electrode 22C of the oxygen concentration measuring cell 22 through the Vs+ terminal 33. The minute current supply circuit 3G supplies a minute current Icp to the oxygen concentration measuring cell 22 in a direction in which oxygen in the measurement gas chamber 23 is sent as an oxygen reference source to the second measurement electrode 22C. By the supply of the minute current Icp, an oxygen concentration in an atmosphere around the second measurement electrode 22C is kept at a reference value.

The heater driving circuit 3H drives (operates) the heater 24 by applying a drive voltage to the heater 24. The heater driving circuit 3H adjusts or controls the drive voltage of the heater 24 so that the internal resistance of the oxygen concentration measuring cell 22 becomes a target value.

The output part 3I outputs a signal relating to voltage applied to the diagnostic resistance 3F when inputting an arbitrary digital signal to the DA conversion circuit 3A in a situation in which the oxygen concentration measuring cell 22 is not in a measurable state (i.e. in a situation of a non-measurable state in which oxygen ion conductivity does not occur in the pump cell 21) to the diagnosing part 5 provided in an external device (e.g. the ECU). The signal that the output part 3I outputs may be a voltage value itself.

<Judging Part>

The judging part 4 judges whether a current state is the measurable state in which the electromotive force can be generated at the oxygen concentration measuring cell 22. The judging part 4 could be incorporated into the ECU.

For instance, the judging part 4 judges a state in which temperature of the gas to be measured is low or a state of a cold start of a vehicle mounting therein the gas sensor system 1 to be a state in which the measurement is impossible (i.e. the non-measurable state), and judges the other states to be the measurable state.

The temperature of the gas to be measured can be received, for instance, as a signal from the ECU. The cold start can be judged, for instance, by receiving an ON-signal of a key of the vehicle from the ECU, or could be judged by a magnitude of the internal resistance of the oxygen concentration measuring cell 22, behavior of the electromotive force Vs of the oxygen concentration measuring cell 22, etc.

The judging part 4 notifies the diagnosing part 5 whether the current state of the oxygen concentration measuring cell 22 is the measurable state or the non-measurable state.

<Diagnosing Part>

The diagnosing part 5 diagnoses a failure of the DA conversion circuit 3A. The diagnosing part 5 is a part of the external device connected to the gas sensor control device. The diagnosing part 5 could be incorporated into the ECU. Further, the judging part 4 and the diagnosing part 5 may be configured as one circuit or one device. The diagnosing part 5 forms a gas sensor control system together with the gas sensor control device (i.e. the circuit part 3 and the judging part 4).

The diagnosing part 5 diagnoses the failure of the DA conversion circuit 3A on the basis of the signal relating to the voltage applied to the diagnostic resistance 3F which is outputted from the output part 3I.

More specifically, when the judging part 4 judges that the current state is the non-measurable state, and also in a state in which the DA conversion circuit 3A is disconnected from the PID operating circuit 3D and the AD conversion circuit 3C is connected to the Ip+ terminal 31 by the switching path 30, the diagnosing part 5 inputs one digital signal to the DA conversion circuit 3A.

When an absolute value of a difference between a measurement value of the voltage applied to the diagnostic resistance 3F on the basis of the input of the digital signal and an assumed value exceeds a predetermined threshold value, the diagnosing part 5 judges the DA conversion circuit 3A to be a failure, and outputs its result to the ECU etc.

For instance, in a case where the digital signal inputted to the DA conversion circuit 3A is a value equivalent to 0 mA, when an absolute value of a value obtained by subtracting voltage of the COM terminal 32 from voltage of the Ip+ terminal 31 (i.e. an absolute value of the voltage applied to the diagnostic resistance 3F) exceeds the threshold value, the DA conversion circuit 3A is judged to be an ON-failure (that is, a failure in which the DA conversion circuit 3A does not switch to an OFF-state has occurred).

Further, in a case where the digital signal inputted to the DA conversion circuit 3A is a value equivalent to 1 mA, when a voltage difference obtained by subtracting voltage to be applied to the diagnostic resistance 3F when the DA conversion circuit 3A is normal from the voltage applied to the diagnostic resistance 3F is a negative, and also when an absolute value of this voltage difference exceeds the threshold value (that is, the voltage applied to the diagnostic resistance 3F is too small), the DA conversion circuit 3A is judged to be an OFF-failure (that is, a failure in which the DA conversion circuit 3A does not switch to an ON-state has occurred).

The diagnosing part 5 inputs a plurality of different digital signals to the DA conversion circuit 3A, and measures the voltage applied to the diagnostic resistance 3F each time the diagnosing part 5 inputs the plurality of different digital signals, thereby estimating which bit of the DA conversion circuit 3A has failed.

[1-2. Operation]

In the following description, an operation performed by the gas sensor system 1 will be explained with reference to a flow diagram of FIG. 2.

The gas sensor system 1 first judges whether a current state is a state in which measurement of the oxygen concentration is possible by the judging part 4 (step S10). If the current state is the measurable state (step S10: YES), the gas sensor system 1 starts the measurement of the oxygen concentration (step S60).

On the other hand, if the current state is a state in which the measurement of the oxygen concentration is impossible (step S10: NO), the gas sensor system 1 inputs the digital signal to the DA conversion circuit 3A by the diagnosing part 5 (step S20). Subsequently, the gas sensor system 1 measures the voltage applied to the diagnostic resistance 3F, and judges whether the DA conversion circuit 3A has failed (step S30).

If the DA conversion circuit 3A has failed (step S30: YES), the gas sensor system 1 outputs an error notification that the failure has occurred (step S40), and drives the heater 24 (step S50). If the DA conversion circuit 3A does not fail (step S30: NO), the gas sensor system 1 drives the heater 24 without outputting the error notification. After driving the heater 24, the gas sensor system 1 starts the measurement of the oxygen concentration (step S60).

It is noted that the input of the digital signal to the DA conversion circuit 3A (step S20) and the failure judgment of the DA conversion circuit 3A (step S30) could be performed repeatedly while changing contents of the digital signal.

[1-3. Effect]

According to the embodiment described above, the following effects can be obtained.

(1a) In the non-measurable state in which the resistance of the pump cell 21 is large then substantially no current flows to the pump cell 21, the current supplied from the DA conversion circuit 3A can be made to flow to the diagnostic resistance 3F. Therefore, by comparing the digital signal inputted to the DA conversion circuit 3A and the voltage applied to the diagnostic resistance 3F, it is possible to diagnose whether current having a correct magnitude is supplied from the DA conversion circuit 3A. That is, it is possible to diagnose the failure of the DA conversion circuit 3A.

2. Other Embodiments

Although the embodiment of the present disclosure has been explained above, the present disclosure is not limited to the above embodiment, but can include a variety of embodiments.

(2a) Structures or configurations of the sensor body 2 and the circuit part 3 of the gas sensor system 1 in the above embodiment are not limited to the above-explained structures or configurations. For instance, the sensor body 2 may have a plurality of pump cells and a plurality of measurement gas chambers for one oxygen concentration measuring cell 22.

(2b) Functions performed by one element or one component of the above embodiments could be performed by a plurality of elements or a plurality of components, and functions performed by a plurality of elements or a plurality of components could be performed by one element or one component. Further, a part of the configuration of the above embodiments could be omitted. Moreover, at least a part of the configuration of the above embodiment could be added to the configuration of the other embodiments, or might be replaced in the configuration of the other embodiments. All embodiments included in technical ideas that can be understood from contents recited in scope of claim are the embodiments of the present disclosure.

The invention claimed is:

1. A gas sensor control device configured to be connected to a gas sensor including a solid electrolyte and a pump cell having a first pump electrode and a second pump electrode that are separately arranged on the solid electrolyte, the gas sensor control device comprising:
a DA conversion circuit configured to supply a pump current having a magnitude corresponding to an inputted digital signal to the pump cell;
a reference electric potential generating circuit configured to keep an electric potential of the first pump electrode at a reference electric potential;
a diagnostic resistance connected to the pump cell parallel to the pump cell, wherein a resistance value of the diagnostic resistance is within 100 kΩ to −10 MΩ; and
the gas sensor control device being configured to:
determine whether a current state is a state in which a measurement of oxygen concentration is possible or impossible, wherein the measurement of oxygen concentration is determined to be possible when oxygen ion conductivity occurs in the pump cell and is determined to be impossible when oxygen ion conductivity does not occur in the pump cell,
if the current state is that measurement of the oxygen concentration is possible, then start the measurement of the oxygen concentration,
if the current state is that measurement of the oxygen concentration is impossible, then input a digital signal to the DA conversion circuit, measure a voltage applied to the diagnostic resistance, and determine whether the DA conversion circuit has failed, and output a signal relating to the voltage applied to the diagnostic resistance to an external device.

2. A gas sensor control system comprising:
the gas sensor control device claimed in claim 1; and
the external device, which is connected to the gas sensor control device and is configured to receive the signal output from the gas sensor control device,
wherein the external device is configured to diagnose a failure of the DA conversion circuit on the basis of the signal relating to the voltage.

3. A gas sensor system comprising:
the gas sensor; and
the gas sensor control system claimed in claim 2.

* * * * *